United States Patent
Denis et al.

(10) Patent No.: US 9,993,890 B2
(45) Date of Patent: Jun. 12, 2018

(54) SYSTEM AND METHOD FOR DATA EXCHANGE AND CONTROL WITH A WIRELESS REMOTE CONTROL FOR WELDING SYSTEMS

(71) Applicant: Illinois Tool Works Inc., Glenview, IL (US)

(72) Inventors: Marc L. Denis, Lena, WI (US); Michael A. Gill, Neenah, WI (US); Todd G. Batzler, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 428 days.

(21) Appl. No.: 14/064,690

(22) Filed: Oct. 28, 2013

(65) Prior Publication Data

US 2015/0114941 A1    Apr. 30, 2015

(51) Int. Cl.
| | |
|---|---|
| *B23K 9/095* | (2006.01) |
| *B23K 9/10* | (2006.01) |
| *G08C 17/00* | (2006.01) |
| *H04L 29/08* | (2006.01) |
| *H04L 29/06* | (2006.01) |
| *H04M 1/725* | (2006.01) |

(52) U.S. Cl.
CPC ........... *B23K 9/1087* (2013.01); *B23K 9/095* (2013.01); *B23K 9/0953* (2013.01); *B23K 9/1043* (2013.01); *G08C 17/00* (2013.01); *H04L 67/125* (2013.01); *H04L 69/12* (2013.01); *G08C 2201/20* (2013.01); *H04M 1/72533* (2013.01)

(58) Field of Classification Search
CPC .......... B23K 9/10; B23K 9/32; B23K 9/1087; G06F 15/173; G06B 19/4063

USPC .... 219/76.14, 130.1, 130.5, 132, 136, 137.7
See application file for complete search history.

(56) References Cited

U.S. PATENT DOCUMENTS

| | | |
|---|---|---|
| 6,504,131 B1 | 1/2003 | Hayes |
| 6,624,388 B1 | 9/2003 | Blankenship et al. |
| 6,849,826 B2 | 2/2005 | Hayes |
| 7,411,155 B2 | 8/2008 | Hayes |
| 7,873,495 B2 | 1/2011 | Lindell |

(Continued)

FOREIGN PATENT DOCUMENTS

| | | |
|---|---|---|
| CN | 2845055 Y | 12/2006 |
| CN | 101516562 A | 8/2009 |

(Continued)

OTHER PUBLICATIONS

I, Robot 2004 movie synopsis, http://tvtropes.org/pmwiki/pmwiki.php/Film/IRobot.*

(Continued)

*Primary Examiner* — Brian Jennison
(74) *Attorney, Agent, or Firm* — McAndrews, Held & Malloy, Ltd.

(57) ABSTRACT

A system and method for wirelessly controlling, monitoring, and updating various welding parameters from a remote device using a single remote control. The remote does not need to have the software to communicate with the welding-type system prior to initiating communications with the welding-type system. Rather, the welding-type system can provide a code download to the remote to perform an over-the-air programming of the remote to configure the remote to control the welding-type system.

20 Claims, 11 Drawing Sheets

(56) References Cited

U.S. PATENT DOCUMENTS

| | | | | |
|---|---|---|---|---|
| 2004/0232128 A1* | 11/2004 | Niedereder | ........ | B23K 9/1056 |
| | | | | 219/130.5 |
| 2005/0127053 A1* | 6/2005 | Hayes | ................ | B23K 9/0953 |
| | | | | 219/130.01 |
| 2005/0197115 A1 | 9/2005 | Clark et al. | | |
| 2006/0249507 A1* | 11/2006 | Bohlinger | ............... | H05B 1/02 |
| | | | | 219/486 |
| 2007/0080151 A1 | 4/2007 | Albrecht et al. | | |
| 2008/0061049 A1* | 3/2008 | Albrecht | ............. | B23K 9/0953 |
| | | | | 219/137 R |
| 2008/0116185 A1 | 5/2008 | Luck et al. | | |
| 2008/0116186 A1 | 5/2008 | Luck et al. | | |
| 2009/0049439 A1 | 2/2009 | Hayes | | |
| 2009/0313549 A1 | 12/2009 | Casner et al. | | |
| 2010/0180271 A1* | 7/2010 | Arsenault | ................ | G06F 8/65 |
| | | | | 717/168 |
| 2012/0110091 A1* | 5/2012 | Chantry | .............. | B23K 9/1006 |
| | | | | 709/206 |
| 2012/0158658 A1* | 6/2012 | Wilkerson | ........ | G06F 17/30578 |
| | | | | 707/638 |
| 2012/0289277 A1 | 11/2012 | Ahmed et al. | | |
| 2013/0112673 A1 | 5/2013 | Petrilla et al. | | |
| 2014/0051358 A1 | 2/2014 | Dina et al. | | |
| 2014/0251969 A1 | 9/2014 | Stoner et al. | | |
| 2015/0114942 A1 | 4/2015 | Denis | | |

FOREIGN PATENT DOCUMENTS

| | | |
|---|---|---|
| CN | 102170301 A | 8/2011 |
| CN | 202726272 U | 2/2013 |
| JP | 2009512274 A | 3/2009 |

OTHER PUBLICATIONS

PCT International Search Report and Written Opinion, PCT/US2014/047501, dated Jan. 14, 2015, 12 pages.

* cited by examiner

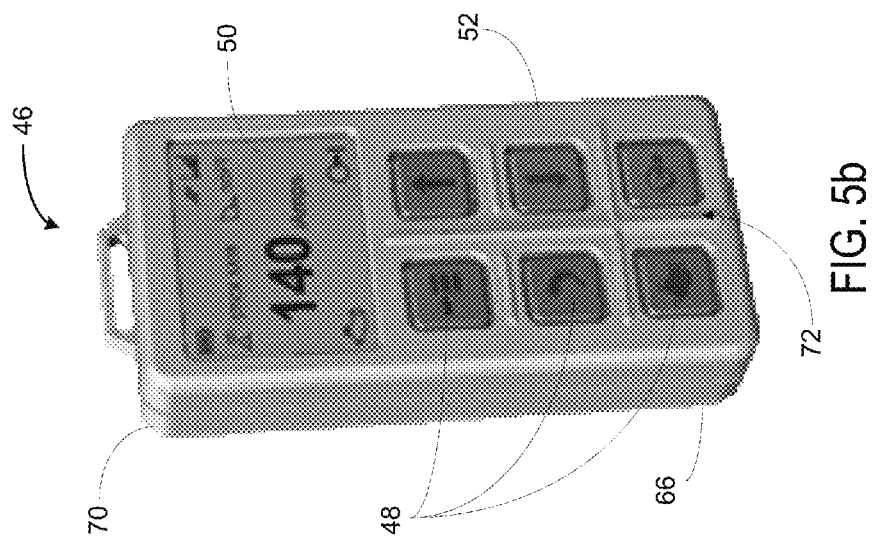

SYSTEM AND METHOD FOR DATA EXCHANGE AND CONTROL WITH A WIRELESS REMOTE CONTROL FOR WELDING SYSTEMS

BACKGROUND OF THE INVENTION

The field of the invention relates to systems and methods communicating with welding-type devices. More particularly, the invention relates to a system and method for wirelessly identifying, monitoring, and controlling remote welding-type devices.

Welding, heating, and cutting are essential operations in many different areas of manufacturing and construction in today's economy. The versatility and efficiency of welding, induction heating, and cutting systems (hereinafter, welding-type systems) is vital to, and allows for, the efficient completion of many complex and dynamic welding operations. In many welding, induction heating, and cutting processes performed by operators, welding-type systems are adjusted during the process to accommodate several different welding-type and related operations. When the need for such adjustments arise, the parameters in the welding-type system need to be properly set for each different welding-type process. In each of these processes, parameters need to be set and adjusted prior to and during the welding-type process. In many instances, the welding-type process takes place at a distance from the systems that drive the process, such as the power source and other components. Thus, an operator is required to walk back to the machine to make any necessary adjustments. To overcome this problem, some welding-type systems have started to incorporate some form of remote control. In many existing systems, power and communications between an operator location and a welding-type power source location are transmitted over cables. These cables provide a simple and reliable means for communication and control of various operational and control parameters.

Despite the benefits of such a set-up, there are also numerous drawbacks associated with communication and control of the welding-type system in such a manner. One drawback to this cable-based control is that the communications cable is typically fragile relative to the welding cables designed to carry high currents at high voltages. Welding-type systems are often used at sites where systems need to be periodically relocated or surrounded by other mobile heavy equipment operating in the same area. As such, the remote control communications cable can become damaged by being crushed or snagged from contact with surrounding machines and/or traffic. This can cause damage to the welding-type power source through the internal power conductors and sensitive signal level circuitry. Even if no permanent damage is experienced, such occurrences obviously reduce productivity.

Communications cables for remote control of a welding device also produce additional concerns. One of these concerns is the introduction of high frequency electrical noise to the welding-type system in the environment surrounding the communications cable. The communications cable provides a conduit for the noise to enter the power source and controller of the welding-type system. Additionally, the introduction of current mode interference in the environment surrounding the communications cable can impede communication. This noise and interference must be filtered out so as not to negatively affect the performance of the system.

Because of the numerous drawbacks associated with communication cables for remote control of a welding-type system, attempts have been to modify the manner of communication in newer systems. Various types of remote control devices have been introduced to facilitate operator control of the welding-type processes thru a means other than just a standard communications cable. For example, wireless communications have implemented into welding-type systems to allow operators to monitor and control the system. However, these wireless connections typically require proprietary wireless terminal devices having different user interfaces depending on the different models of welders or power supplies. In addition, conventional wireless connections to welding-type systems only allow for control of the welding device, and typically a separate remote device is required for the different models of welders or power supplies in the welding-type system.

Another challenge facing welding-type systems relates to maintenance. Welders are often maintained and serviced according to procedures implemented by operators of the welding-type systems. Although some operators may adequately service and maintain these systems, quality of the service and maintenance is often up to the training and competence of the individual operator. Thus, a large collection of well-maintained welders servicing an overall assembly process may be at the mercy of another welding system that is less-adequately serviced or maintained. This may cause the process to stop or be disrupted during service outages relating to a less maintained welding-type system. Even under the best of circumstances, however, given that many welding systems are operating in an isolated manner, diagnostic information relating to the health of these systems is often not reported or discovered until after a breakdown occurs.

Therefore, a need still remains for a controlling, identifying, monitoring, and updating all aspects of a welding operation in a manner that is practical and efficient for an operator.

SUMMARY OF THE INVENTION

The present invention overcomes the aforementioned drawbacks by providing a welding-type system capable of wirelessly controlling, monitoring, and updating various welding parameters from a remote device using a single remote control. The remote does not need to have the software to communicate with the welding-type system prior to initiating communications with the welding-type system. Rather, the welding-type system can provide a code download to the remote to perform an over-the-air programming of the remote to configure the remote to control the welding-type system.

In accordance with one aspect of the invention, a welding-type system is disclosed that includes a power source having a controller to regulate welding operations for at least one welders and a wireless communication system configured to receive a wireless signal and provide the wireless signal to the controller for controlling the at least one welder according to at least one operational parameter indicated by the wireless signal. The system also includes a pairing apparatus coupled to the wireless communication system and configured to identify a wireless remote control capable of communicating with the wireless communication system and identify the wireless remote control as being in an up-programmed state by communicating with the wireless remote control over the wireless communication system. The apparatus is further configured to initiate a code download to the wireless remote control using an over-the-air programming protocol when the wireless remote control is in an un-programmed state to configure the wireless remote control to select the at least one operational parameter and communicate the at least one operational parameter using the wireless signal to the controller.

In accordance with another aspect of the invention, a method for remotely controlling a welding-type system is disclosed that includes providing a power source having a controller for regulating welding operations for a plurality of welders and transmitting a wireless signal from a wireless remote control to the controller to control at least one of a plurality of welding parameters in the plurality of welders. The method also includes receiving the wireless signal to allow the controller to communicate with the wireless remote control, pairing the wireless remote control to the controller via a radio apparatus installed on the wireless remote control, and accessing and regulating at least one of the plurality of welding parameters of at least one of the plurality of welders via the radio apparatus of the wireless remote control.

In accordance with another aspect of the invention, a remote control system for communicating with a welding-type system is disclosed that includes a wireless communication system configured to send and receive a wireless signal with at least one of a plurality of welding-type systems and a memory having at least a boot loader stored thereon. The system also includes a processor configured to communicate with at least one of a plurality of welding-type systems using the wireless communication system to indicate an identify of the wireless remote control and receive a code download from the at least one of a plurality of welding-type systems. The processor is further configured to install the code download using at least the boot loader to configure the wireless remote control to communicate at least one operational parameter to the at least one of a plurality of welding-type systems.

In accordance with another aspect of the invention, a method for remotely controlling a welding-type system, the method is disclosed that includes providing a wireless remote control having an antenna system configured to communicate with a plurality of welders and identifying at least one of the plurality of welders. The method also includes determining whether software for communicating with the at least one of the plurality of welders is present in a memory of the wireless remote control and, upon determining that software for communicating with the at least one of the plurality of welders is not present in a memory of the wireless remote control, receiving a code download from the at least one of the plurality of welders. The method further includes installing the code download received from the at least one of the plurality of welders and, using the code download installed on the remote control, controlling operation of the at least one of the plurality of welders.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIGS. 5a and 5b are views of a wireless remote control to be used with the welding-type system of FIG. 1 in accordance with the present invention.

DETAILED DESCRIPTION OF THE INVENTION

Figure 1:
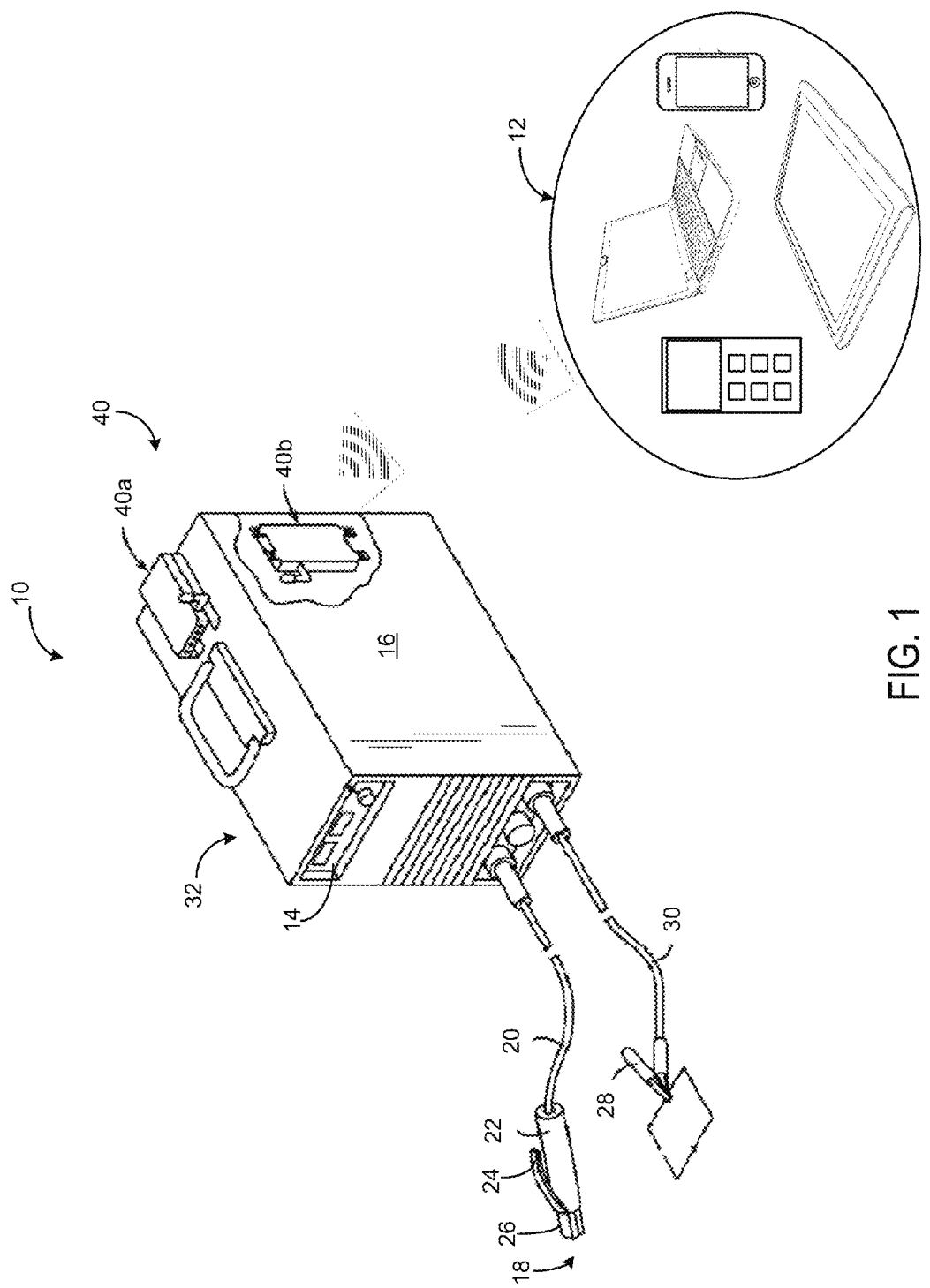
FIG. 1 is a perspective view of a welding-type system and remote control communication type system for controlling a welding-type device according to the present invention.

Referring particularly now to FIG. 1, a host, for example, a welding-type system 10 capable of performing various types of operations is shown. FIG. 1 also shows a terminal device system 12 for accessing and controlling a welding-type device. The welding-type system 10 is merely representative of a wide variety of welding-type machines having various sizes, features, and ratings. The welding-type system 10, as contemplated herein, can be configured to not only perform standard welding type operations such as tungsten inert gas (TIG) welding, metal inert gas (MIG) welding, and/or stick welding, but can also be capable of performing various cutting operations that are closely associated with the various welding procedures, such as plasma cutting and induction heating, for example. In the exemplary embodiment of FIG. 1, the welding-type system 10 shown is a TIG welding system, however, one skilled in the art will readily appreciate that it may be any related welding or cutting system, including those listed above. The TIG welding-type system 10 includes a power source 16 to condition raw power and generate a power signal suitable for welding applications. The power source 16 includes a processor/controller 14 that receives operational feedback and monitors the operation of TIG welding-type system 10. The power source 16 may be, for example, a Trailblazer 325 EFI. Trailblazer is a registered trademark of Illinois Tool Works Inc. Corporation of Glenview, Ill. Connected to the power source 16 is a torch 18 via a cable 20. The cable 20 provides the torch 18 with power and compressed air or gas, where needed. The torch 18 includes a handle portion 22, or torch body, having a trigger 24 thereon to actuate the torch 18 and work tip 26 extending therefrom.

Also connected to power source 16 is a work clamp 28 which is designed to connect to a workpiece (not shown) to be welded. Connecting the work clamp 28 to the power source 16 is a cable 30 designed to complete the welding circuit with the torch 18 through the workpiece and the work clamp 28. The power source 16 may be designed to be connected to a transmission line power receptacle (not shown) or may be designed as an engine-driver welding system. In the latter case, the engine may be integrated within a housing 32 of the power source 16 or may be within a separate housing (not shown) and connected to the power source 16.

As mentioned, the terminal device 12 is available to be paired with a radio apparatus 40 coupled with the power source 16 to set and adjust operational parameters, as well as send and receive software updates to and from the welding-type system 10. In one example, the radio apparatus 40 may be an externally-mounted radio apparatus 40a designed to be disposed on the outside of the housing 32 of the power source 16. This configuration may be advantageous for maximizing range and reception. Alternatively, the radio apparatus 40 may be an internally-mounted radio apparatus 40b designed to be disposed inside the housing 32 of the power source 16. This configuration provides advantages of protecting the radio-apparatus 40 using the housing 32 of the power source 16. The radio apparatus 40 is capable of operating as a Wireless Communication terminal (WCT) so that the terminal device 12 can be paired with the welding-type system. Various communication protocols, systems, and hardware can be used to wirelessly transmit communicate using the radio apparatus 40.

Figure 2:
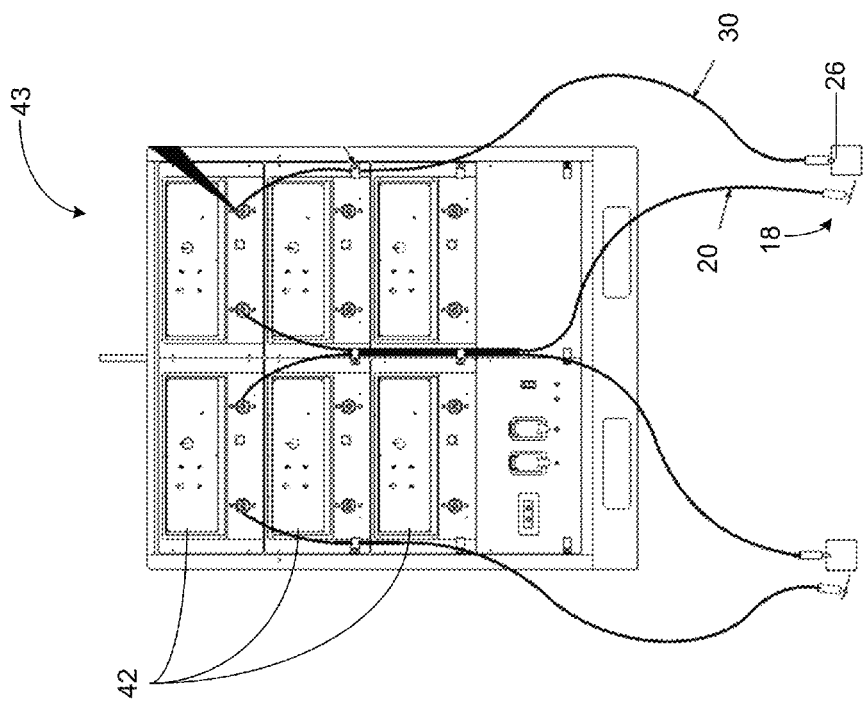
FIG. 2 is a perspective view of multiple power supplies for the welding-type system of FIG. 1 to implement the present invention.

The terminal device 12 can communicate with the controller 14 via the WCT 40. The WCT 40 may be configured to receive and relay wireless signals from the terminal device 12 to the controller 14 to process the received wireless data. The controller 14 is further operatively connected to the power source 16, and in this manner, the terminal device 12 may configure, monitor, and/or control operation of the welding-type system 10. In one embodiment of the present invention, and as shown in FIG. 2, a plurality of welding-type power sources 42 may include the radio apparatus 40 so that the terminal device 12 can be paired with more than one welding-type system 10.

In one embodiment, radio control (RC) signals from the radio apparatus 40 are used. In particular, the radio apparatus 40 may be configured to operate using WiFi protocols. In this regard, the WCT may use an 802.11X wireless protocol, for example, to provide a bridge between wireless 802.11X devices and a local area network (LAN). As such, the WCT may also be referred to as a wireless access point (WAP). However, other wireless communication systems and methods can include, but are not limited to, radio frequency (RF) such as ZigBee protocols, Bluetooth protocols, cellular protocols, proprietary protocols, and the like. More particularly, the wireless communication systems and methods can include Bluetooth Low Power (BLE) (i.e., BT 4.0), cellular digital packet data, high speed circuit switched data, packet data cellular, general packet radio service, radio transmission technology, Bluetooth, IRDA, multi-channel multipoint distribution service, local multipoint distribution service, WiMAX, 802.11 WiFi, infrared, UHF, VHF, RIM, and others.

If an 802.11X based radio apparatus 40 is used, for example, as a wireless transmitter, proprietary wireless terminal devices are not required. Rather, any WiFi enabled terminal device 12, such as a smart phone, tablet, laptop, or specialized remote as shown in FIG. 1, may be used to connect to a webpage served by the WCT 40 to effect file transfers or remote welding-type system 10 setup and control and more than one terminal device 12 may connect simultaneously, if so configured. Similarly, if a Bluetooth (for example, 802.15.1) based radio apparatus 40 is used, for example, as a wireless transmitter any Bluetooth enabled terminal device 12, such as a smart phone, tablet, laptop, or specialized remote may be used to connect to the webpage served by the WCT 40 to effect file transfers or remote welding-type system 10 setup and control. However, in the case of a Bluetooth based radio apparatus 40, for example, pairing of the terminal device 12 may be required and the system may or may not allow more than one terminal device 12 to connect to the webpage simultaneously.

Figure 3:
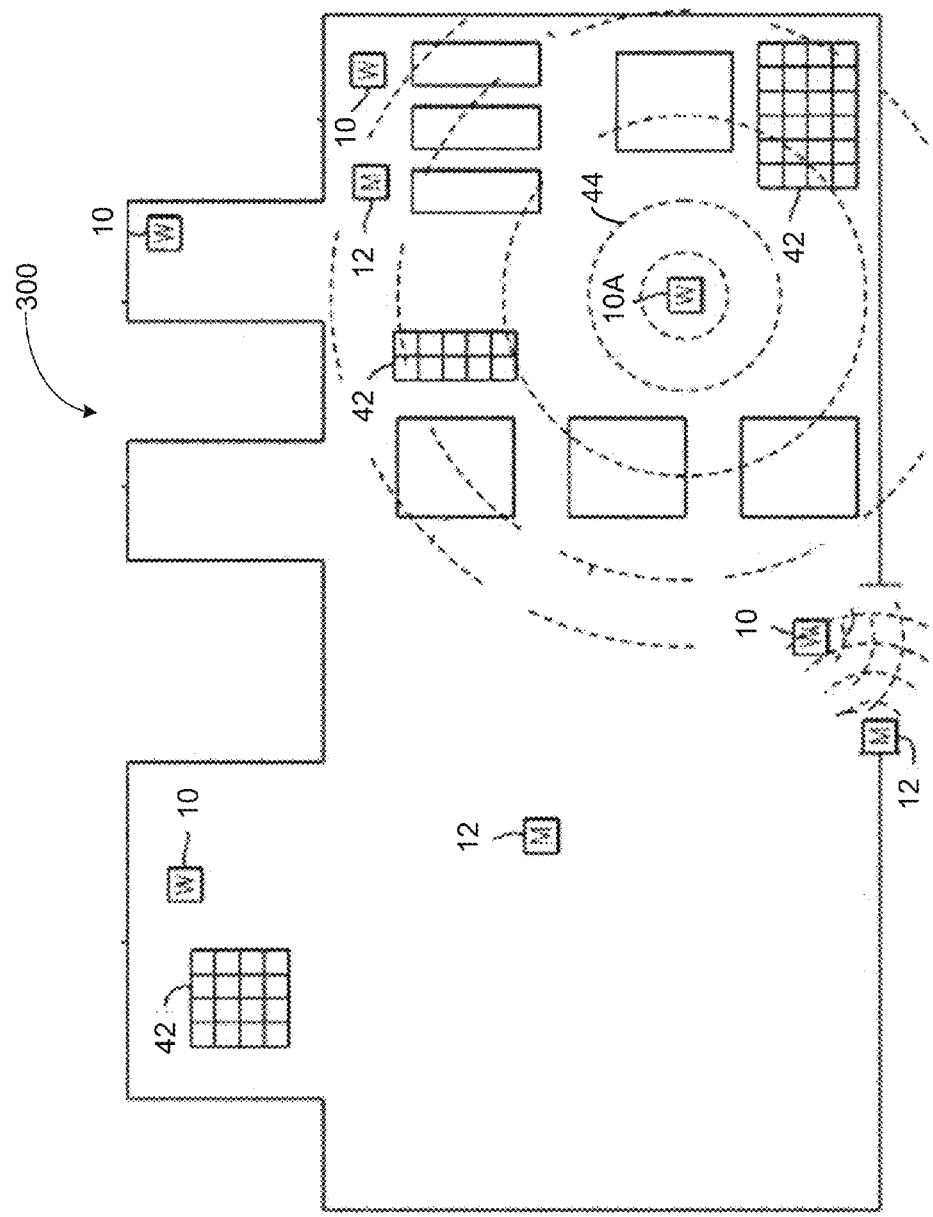
FIG. 3 is a diagram illustrating an industrial fabrication facility including multiple welders to implement the present invention.

The operation of the WCT 40 is not restricted to operating in a particular manner, such as to provide access to a network originated by the WCT 40. For example, the WCT 40 could also be operated to cause the welding-type system 10 to connect to an existing local area network. Such would take place, for example, in a plant 300, as shown in FIG. 3, with WCTs installed, or, if a WiFi hotspot, as in a smart phone, were available. In addition, the wireless communication provides a viable alternative to cabled connections, such as USB cable connection or Serial data port connection using a wired cable connection, from the welding-type system 10 to the terminal devices 12. It is recognized that the mode of communication selected will depend on the specific needs of the welding-type process and on the environment in which the process is being performed in.

Figure 4:
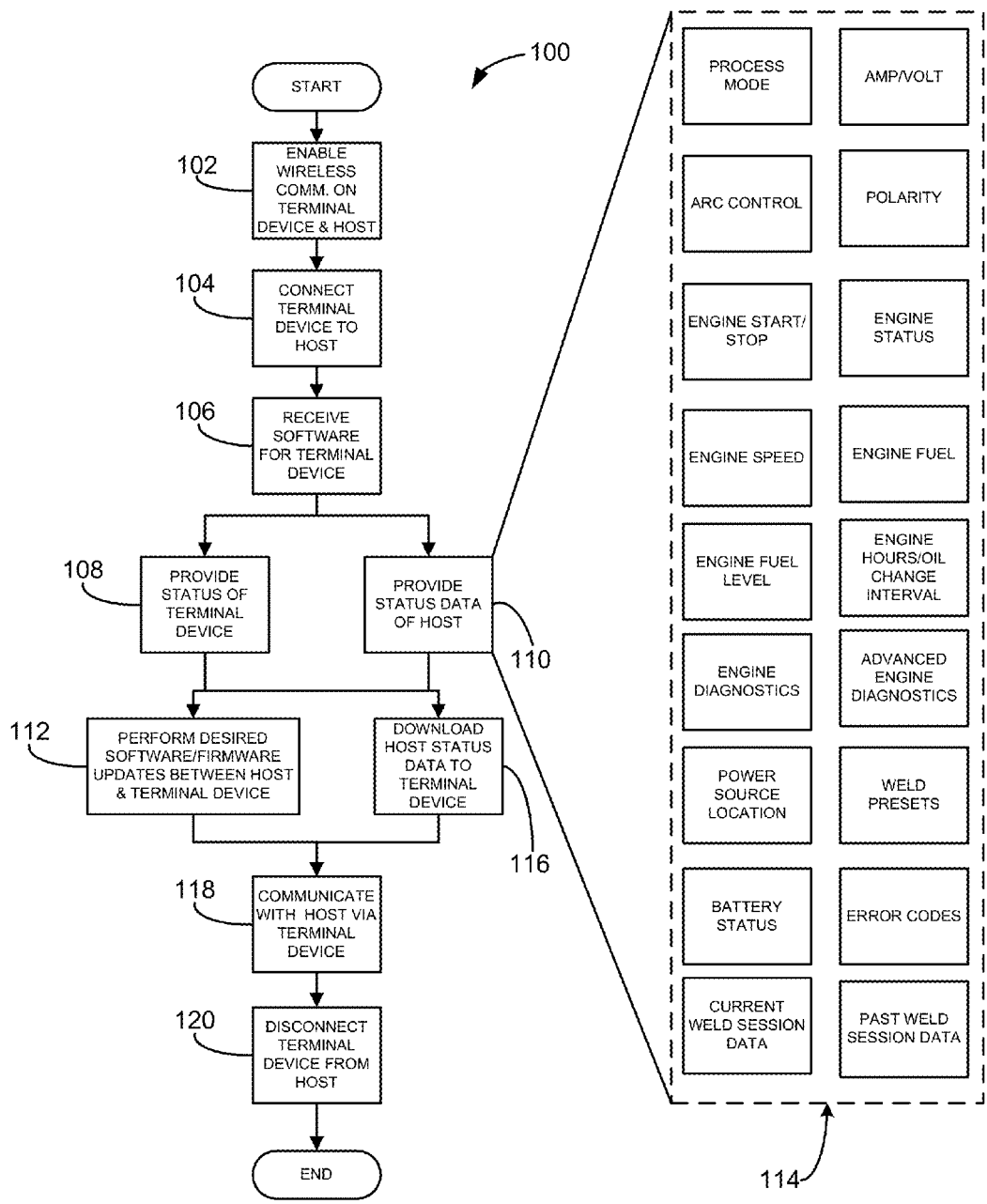
FIG. 4 is a flow chart setting forth the steps of processes for pairing a terminal device to the welding-type system in accordance with the present invention.

Referring now to FIG. 4, a flow chart setting forth exemplary steps 100 for using a terminal device with a power source of a welding-type system, such as the system 10 of FIG. 1, is provided. To start the process, a user may enable the communication on the terminal device as shown at process block 102. The communication on the welding-type system is enabled through a radio apparatus that is capable of serving wireless communication, also shown at process block 102. For example, in the case of the radio apparatus enabling the system to operate as a WCT, other terminal devices 12 (e.g., other device configured for wireless communication) can join/pair to it, as shown at process block 104. As will be appreciated, the connecting/pairing of the terminal device and welding-type system may take any of a variety of forms, depending upon the underlying wireless communications protocol being employed and the desired security procedures employed.

The welding-type system may be configured to provide a communications portal to the terminal device, as shown at process block. For example the welding-type system may provide a user interface for the terminal device 106, such as by providing an hyper-text markup language (HTML)-based interface. However, as will be described further below, the welding-type system may provide operational software for communicating with and/or controlling the welding-type system.

At process blocks 108 and 110, the welding-type system and the terminal device may exchange status information. For example, the status of whether the terminal device may indicate to the welding-type system whether the terminal device needs any software upgrades or updates for further communications or interactions. As will be described in detail below, the welding-type system may provide software, firmware, and/or updates to the terminal device to configured the terminal device for further communications/interactions.

For example, the welding-type system may send/push, via the WCT, any necessary software or firmware upgrades, updates, and features to the terminal device to facilitate communication with and/or control of the welding-type system. In this regard, the welding-type system may store and maintain basic software or firmware necessary to communicate with and/or control the welding-type system and this software or firmware may be pushed, as necessary, to a terminal device. In this way, the terminal device does not need to be specially configured or adapted to, or even include requisite software to, communicate and/or control the welding-type system. Rather, the terminal device, particularly in the case of a specialized or proprietary remote control, such as will be described with respect to FIGS. 5A and 5B, may have only basic software or firmware necessary to initiate connections to welding-type devices, such as to access and receive an interface, for example and HTML based interface, at process block 104. Thereafter, the terminal device may receive from a given welding-type device, the software or firmware necessary to facilitate further communications and/or control. Accordingly, a single terminal device may be used to communicate with any of a variety of welding-type systems. The terminal device does not need to be preconfigured or specially adapted to communicate with a particular welding-type system. Rather, a user can utilize one terminal device as a remote control or remote monitor for communicating with any of a variety of welding-type systems without pre-adapting the terminal device for each welding-type system.

The software or firmware received from the welding-type system may enable the terminal device to adapt configurations and weld programs, profiles, locks and limits of the welding-type system and power source. In addition, the terminal device may send/push, via the WCT, any necessary software or firmware upgrades, updates, and features from a remote file server (not shown) to the welding-type system.

The status data, as represented by block 114, provided by the welding-type system can include, but is not limited to, weld process mode (e.g., MIG, TIG, and/or stick), amperage and voltage, arc control, polarity, engine start/stop, engine status (e.g., on, off, auto-speed), engine speed, engine fuel level, engine hours/oil change interval, engine diagnostics, advanced engine diagnostics, location of power source (e.g., via beeper and/or lights), weld presets, battery status, error codes, and data from current and past welding sessions.

These are just a few examples. The WCT may also be connected to operation status sensors (not shown). A power sensor, for example, may be employed to notify whether a welding-type device is "on" or "off", whether the torch 18 or gun is operating or not, current battery level(s), and other operational conditions derived from sensed power levels. In addition, the WCT may be connected to component fault sensors (not shown). A number of sensors may be employed, each sensor being individually configured to detect an operational error in a particular component of a welding-type device. The processor of the welding-type system or the terminal device may record summaries of the time or operating conditions under which errors occur onto data storage unit (not shown), and/or prepare real-time component error messages as soon as errors occur. Furthermore, other sensors may be used to detect current device resources, such as the amount of consumable wire remaining, the amount of remaining shielding gas, which accessories are attached to the device, and whether the accessories are compatible with the device's system type. The processor of the welding-type system or terminal device can then calculate whether or when additional resources will be required based on recent usage data stored on data storage unit, or based upon predetermined minimum levels. Accordingly, summaries of operation status, continuous real-time operation status information, or automatic notifications of current or imminent errors and requirements may be communicated, stored, and accessed.

Thus, the terminal device may download any of the status data 114 as shown at process block 116 of a single welding-type system 10 as shown in FIG. 1, or from the plurality of power sources 42, as shown in FIG. 2. Notifications, such as e-mail or text message for example, of the status data 112 of the welding-type system may be sent to the terminal device. In an alternative embodiment, the status data 112 may be part of an automated data collection process that connects to each of the processors 14 of the plurality of power sources 42 of FIG. 2 within its range to collect, record, report, and re-transmit to a web-based cloud or data server (not shown) and provide configuration of the plurality of power sources 42 through the same interface.

Referring back to FIG. 4 and with reference to FIG. 3, the terminal device 12 may control and configure any one of the status data 114 remotely, as shown at process block 118. As will be described, terminal may be configured to provide a common interface for the user, allowing them to use over the air programming to configure and control the status data 114 of a plurality of power sources. As one example, the terminal device 12 may use a find function provided by the interface in order to identify a welding-type system 12 having an issue in the plurality of power sources 42. The find function on the interface could be initiated by the user that would activate a beeper and/or lights 44, for example, on a particular welding-type system 10A having issues so the user can easily identify the welding-type system within a larger environment 300. As another example, the terminal device 12 may use an engine ignition management function provided in order to remotely power down the particular welding-type system 10A and put it in sleep mode. When the welding-type system 10A is in sleep mode, it may be started again through the engine ignition management function on the terminal device 12.

Once the terminal device 12 has sent and/or received the desired status data 114, the user may disable the wireless communication on the terminal device 12 or unpair the terminal device 12 from the welding-type system 10, as shown at process block 120.

Figure 5A:
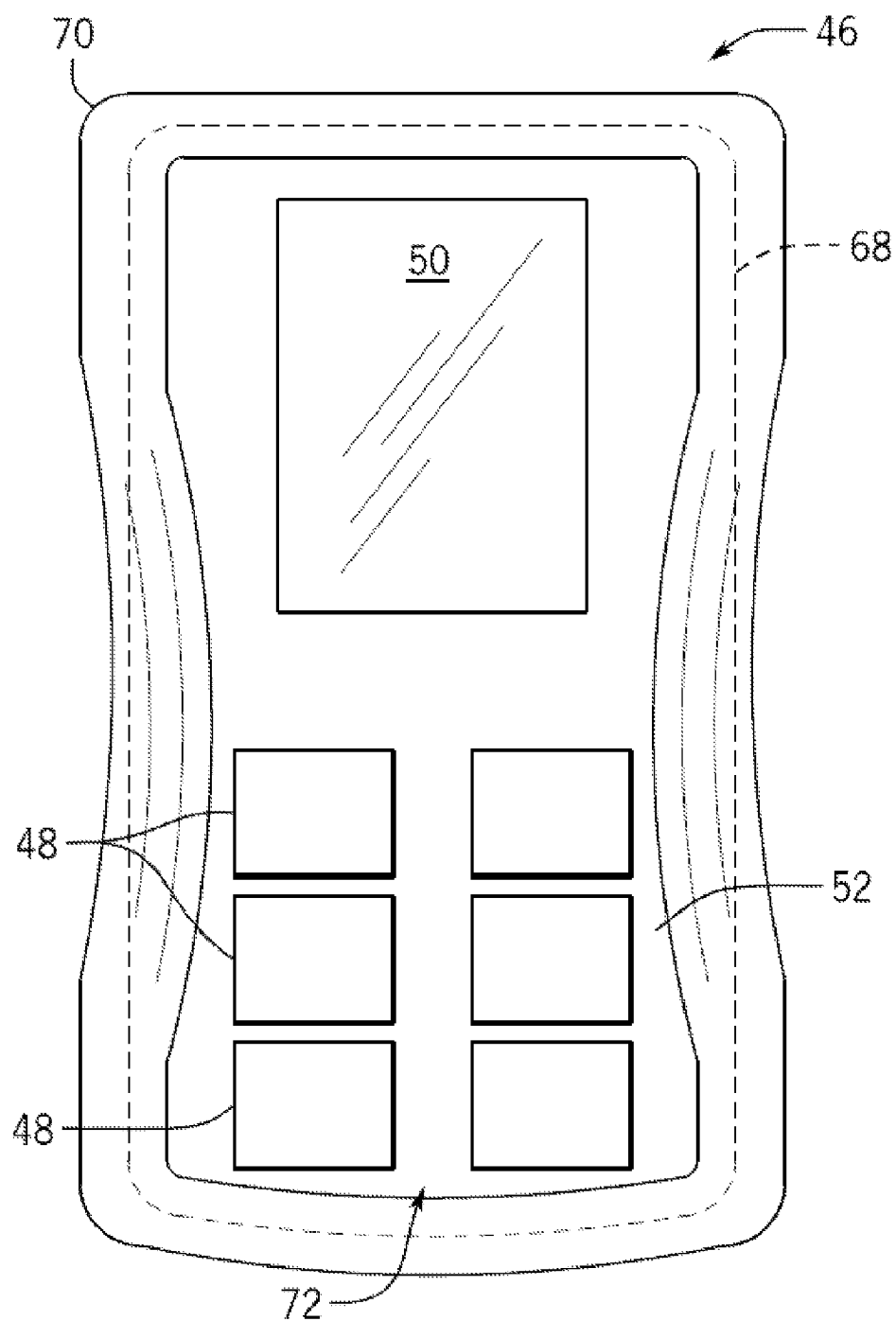
Figure 6:
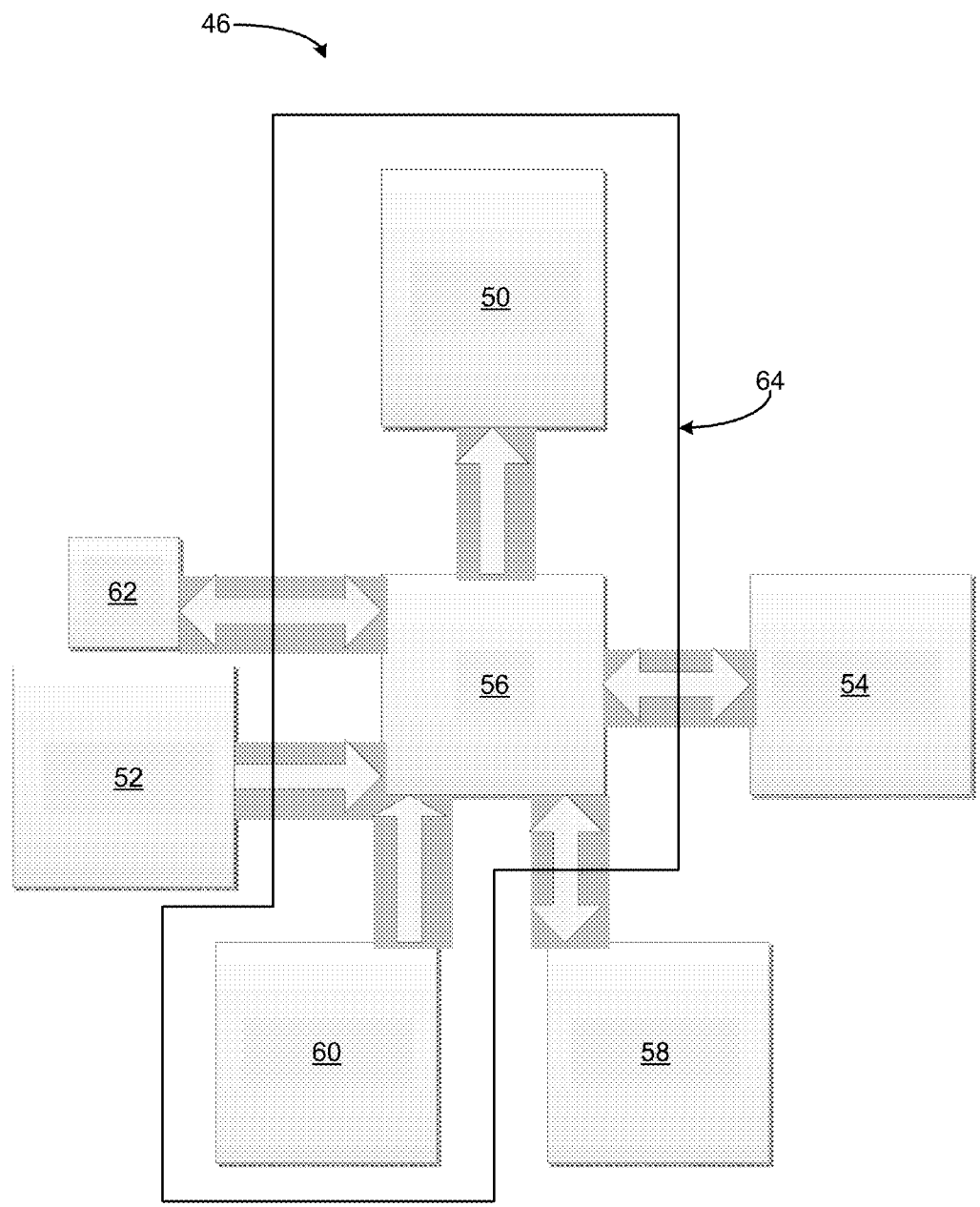
FIG. 6 is a diagram illustrating the interaction of the wireless remote control components.

Referring now to FIGS. 5a, 5b, and 6, a wireless remote control 46 to be used in the welding-type system 10 is shown. The wireless remote control 46 includes a plurality of buttons 48 that are reconfigurable. As reconfigurable buttons 48, when pressed, the reconfigurable buttons 48 can display anyone of the above-described status data. The wireless remote control 46 may provide, for example, a hand-held, battery-operated, user-interface device that incorporates a varying assortment of wireless radio interface standards (e.g., ISO-14443 (RFID), IEEE802.11 (WiFi in various speeds), IEEE802.15.4 (ZigBee)). The wireless remote control 46 may include a graphic display 50, a keypad 52 including the plurality of buttons 48, a radio apparatus 54, a central processing unit 56, a flash memory 58, a battery pack 60, and a real-time clock 62. In construction, there may be four subassemblies of the wireless remote control 46 that include a host board 64, the radio apparatus 54, a lower case 66 with the battery pack 60, and a keypad printed circuit board (PCB) 68. The host board 64 may include the central processing unit 56, the flash memory 58, the battery pack 60, and the graphic display 50. There are connectors to the keypad PCB 68, the radio apparatus 54, and the battery pack 60. The battery pack 60 may be integral to the lower case 66 and includes of terminals and a fixture to hold and make contact with, for example, two AA Alkaline batteries.

The graphic display 50 of the wireless remote control 46 may be, for example, a quarter video graphics array (QVGA), full color back-lit LCD display (e.g., a Santec ST0240Y3W-RSLW-F), a back-lit transflective LCD display, or a custom display. Graphics data may be presented to the graphic display 50 in a parallel word format, as shown in FIG. 5b. The backlight scheme for the graphic display 50 may use multiple LEDs with common anodes and cathodes, for example. The common cathode signal is presented to a transistor (not shown) that duty cycles the ground connection to allow brightness control. A pulse-width modulation (PWM) circuit (not shown) effects both current limiting for the LED array and brightness control by allowing the CPU 56 to perform a PWM control loop. The CPU 56 may have a commanded maximum brightness (user input) and may use a light sensor (not shown) to vary the PWM duty cycle based on the ambient light. The CPU 56 operates the light sensor by applying a logic "High" to an input signal, which powers the circuit. An output signal may then be measured by an ADC (not shown) in the CPU 56 and the number is used in the PWM control loop.

As shown in FIGS. 5*a* and 5*b*, the keypad 52 can, for example, have the plurality of reconfigurable buttons 48 arranged in a six button array, arranged in three rows of two buttons per row. The plurality of reconfigurable buttons 48 may be open circuited and have a nominal 3.0 VDC potential, for example, on the un-grounded pad. Pressing one of the plurality of buttons 48 shorts that voltage to ground where it is detected at the CPU 56 port for the button. The keypad 52 may be, for example, a single layer PCB with a flexible etched polyamide cable connecting the keypad 52 to the host board 64. The plurality of buttons 48 may be a dome switch with the switch contacts on the thin keypad PCB 68. The flexible cable and the dome switch patterns may be one board with a graphics polymer overlay (not shown) to hold the dome springs in place. The keypad PCB 68 may also form the graphic display's 50 outer bezel and protective covering 70. Additionally, the reconfigurable buttons 48 may be touch buttons having a display integrated therewith to be readily adapted to having the symbols or displayed information associated with the buttons adjusted based on reconfigurations.

The radio apparatus 54 of the wireless remote control 46 may be a certified FCC modular transmitter, for example. In one exemplary embodiment, the radio apparatus 54 may be a California Eastern Labs (CEL) model ZICM357SP0-1 IEEE 802.15.4 compliant radio with the Ember ZigBee Pro Network software stack programmed into it, for example. Additionally, the radio apparatus 54 may have an internal antenna. The radio apparatus 54 may only be tasked to provide network services, so that there are no user applications programmed onto it. The radio apparatus 54 may connect to the host board 64 using a 'universal' 16 pin interface (not shown) that provides power and ground signals to the radio apparatus 54 along with a universal asynchronous receiver/transmitter (UART) and a serial peripheral interface (SPI) serial port interface (not shown). Using the same mechanical outlines and the same 16 pin connector the radio apparatus 54 may be a WiFi radio or a Bluetooth radio, for example in place of the ZigBee radio with the appropriate software changes to the host. Depending on the radio apparatus 54 used, the serial interface could be either a UART or an SPI port, or both.

The wireless remote control 46 may accept DC power from two AA cells (not shown) connected in series and uses two DC switching converters (not shown) to maintain approximately 3.0 volts over the whole life of the battery pack 60. A two wire pigtail from the battery compartment connects to the host board 64. The battery pack 60 interface uses a metal-oxide-semiconductor field-effect transistor (MOSFET) transistor in series with the positive battery lead for reverse polarity protection. The circuit operates by allowing a small current to leak through the MOSFET body diode, which creates charge on the source. This charge may then cause a reverse bias against the gate allowing battery current to flow from drain to source with a minimal voltage loss, dictated by a low channel resistance. If the battery pack 60 were connected in reverse polarity, the applied voltage becomes positive, which keeps the MOSFET Off, and thus the current from drain to source is in the nano-ampere range due to the reverse leakage current. A Si3495 (not shown), for example, may be used to minimize the forward voltage drop across the part. In theory, the drop on the transistor should be roughly 20 mV or less. There are two DC supplies (not shown) on the host board 64. One supply may be dedicated to the radio apparatus 54 and the other is for everything else. The DC supply may be based on the Texas Instruments (TI) TPS61220DCK, for example.

Circuitry is provided to allow software to determine the percentage of battery life remaining in the battery pack 60. As the alkaline cells are depleted, the effective battery source impedance rises. In effect, for a given current drain, the source voltage is reduced on a weaker battery compared to a fresh battery. A means to measure the actual battery voltage is placed on the host board 64. The two resistors used to provide the low voltage detect function also provide a voltage divider to an ADC internal to the CPU 56. This divided signal may be sent to the CPU 56 as known loads are placed on the battery pack 60 and measured.

The host board 64 supports over the air re-programming, as described above, and data collection using the flash memory 58. The flash memory 58 may be a 32 MByte FLASH memory device, for example. Over the air re-programming operates by sending the appropriate target object file over the radio apparatus 54, the ZigBee radio link for example. The operating code for a microcontroller (not shown), such as a MSP430 or a EM357, for example, can be loaded from the flash memory 58. This feature allows the wireless remote control 46 to be manufactured with one object code file for the microcontroller, but it can be re-programmed to acquire different mission profiles. Additionally, firmware updates may be pushed onto the welding-type system 10 using this feature. Other operating modes are possible using the flash memory 58. For example, a "Thick Client" or "Thin Client" mode can be used. In a Thick Client mode, all of the status data 112 is encoded and loaded onto the wireless remote control 46. In a Thin Client mode, the wireless remote control 46 operates as a terminal and all of the operating state machine code is hosted on the welding-type system 10 that hosts the ZigBee radio, for example.

The real time clock 62 may be provided by a circuit (not shown) separate from the CPU 56. The real time clock 62 may operate from the CPU 56 power supply, which will typically be between 2.1 and 3 VDC. In the event of a brownout of power supply failure, such as when the battery pack 60 is being replaced, the wireless remote control 46 may operate in a sleep mode using a CR1025 Lithium coin cell battery, for example. The wireless remote control 46 may communicate with the microcontroller with a three wire serial data interface (not show), for example.

In an exemplary embodiment, the wireless remote control 46 may be manufactured with a boot loader as the only software installed. Additional information on an exemplary boot loader that may be included in the wireless remote control 46 may be found in U.S. Pat. Nos. 6,849,826; 6,849,826; and 7,411,155, the entirety of each of which is expressly incorporated by reference herein. With the 802.15.4 ZigBee radio installed as the radio apparatus 54, the wireless remote control 46 when it attempts to join/pair to a wireless equipped welding-type system 10, the welding-type system 10 will sense that the wireless remote control 46 is either new (un-programmed) or that the wireless remote control 46 lacks the correct programming to be used with the welding-type system 10. The controller 14 of the welding-type system 10 may then initiate a code download to the wireless remote control 46 which uses the over the air (OTA) programming feature of the radio apparatus 54 to place a new code image into the wireless remote control's 46 CPU 56. The wireless remote control 46 may have approximately 128 megabytes of memory which can hold software for a plurality of power sources 42 allowing one physical device (i.e., the wireless remote control 46) to control a plurality of welders 43, each with its own special user interface, thereby providing a uniform training environment to operators of the welding-type system 10. The wireless remote control 46 may advantageously include a menu driven interface 72 to replicate all functionality available on the welding-type system. The interface 72 of the wireless remote control 46 can match the interface of the power source 16, thereby replicating front panel controls of the welding-type system 10. Additionally, the wireless remote control 46 allows a small number of wireless remote controls 46 to be used on multiple welding-type systems 10 within a plant 300, for example, using secure communications, such as Miller tag unit variable (TUV) communications protocol.

Figure 7:
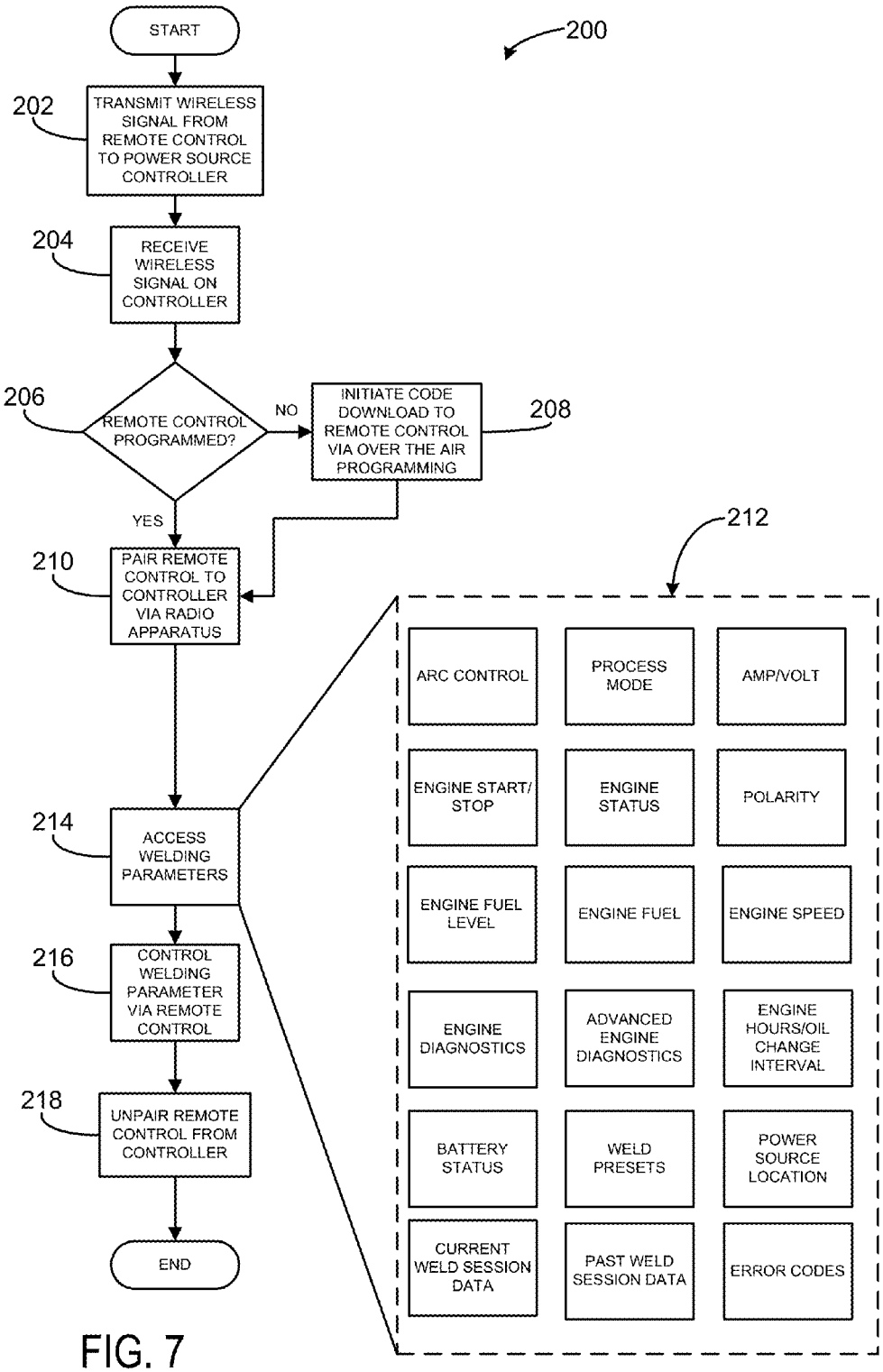
FIG. 7 is a flow chart setting for the steps of processes for pairing the wireless remote control of FIG. 2 with the welding-type system in accordance with the present invention.

Referring now to FIG. 7, a flow chart setting forth exemplary steps 200 for connecting the wireless remote control 46 with the power source 16 of the welding-type system 10 is provided. To start the process, the wireless remote control may transmit a wireless signal from the radio apparatus to the controller of the power source of the welding-type system, as shown at process block 202. The wireless signal is received by a control transceiver (not shown) of the controller, as shown at process block 204. Once the wireless remote control and the power source are in wireless communication, the controller can determine if the wireless remote control is programmed or has the most up-to-date software installed, as shown at process block 206. If the wireless remote control is not programmed, as shown at process block 208, the controller of the welding-type system may then initiate a code download to the wireless remote control. If the wireless remote control is programmed, as shown at process block 210, the wireless remote control and the controller of the power source may communicate via the radio apparatus. Once the setup process is complete, the wireless remote control may access a plurality of welding parameters 212 (similar to the status data 112 of FIG. 4) by pressing one of the plurality of buttons on the wireless remote control, as shown at process block 214. Each of the plurality of buttons may be configured access one of the plurality of welding parameters, as shown at process block 212, and displayed on the graphic display.

The plurality of welding parameters, as shown at process block 112, provided by the welding-type system on the graphic display can include, but is not limited to, weld process mode (e.g., MIG, TIG, and/or stick), amperage and voltage, arc control, polarity, engine start/stop, engine status (e.g., on, off, auto-speed), engine speed, engine fuel level, engine hours/oil change interval, engine diagnostics, advanced engine diagnostics, location of power source 16 (e.g., via beeper and/or lights), weld presets, battery status, error codes, and data from current and past welding sessions. The wireless remote control may download any of the plurality of welding parameters 212 a single welding-type system 10 as shown in FIG. 1, or from the plurality of power sources 42, as shown in FIG. 2.

In addition, the wireless remote control may send/push, via the radio apparatus, any necessary software or firmware upgrades, updates, and features from a remote file server (not shown) to the welding-type system. Likewise, software or firmware upgrades, updates, and features may be sent from the welding-type system to the wireless remote control. Configuration of weld programs, profiles, locks and limits of the welding-type system may be sent and/or received by the wireless remote control. Notifications, such as e-mail or text message for example, of the plurality of welding parameters 212 of the welding-type system may be sent to the wireless remote control.

The wireless remote control may control and configure any one of the plurality of welding parameters 212 remotely, as shown at process block 216, via the plurality of buttons. As described above, the wireless remote control provides a common interface for the user, allowing them to use over the air programming to configure and control the plurality of welding parameters 212 of a plurality of power sources. As one example, the wireless remote control may use a find function provided by one of the plurality of buttons in order to identify a power source having an issue in the plurality of power sources. The find function can be initiated by the user that would activate a beeper and/or lights, for example, on the power source having issues so the user can easily identify the correct power source. As another example, the wireless remote control may use an engine ignition management function provided by one of the plurality of buttons in order to remotely power down the power source of the welding-type system and put it in sleep mode. When the power source is in sleep mode, it may be started again through the engine ignition management function on the wireless remote control.

Once the wireless remote control has sent and/or received the desired welding parameters 212, the user may unpair or disconnect the wireless remote control from the power source of the welding-type system, as shown at process block 218.

Figure 8A:
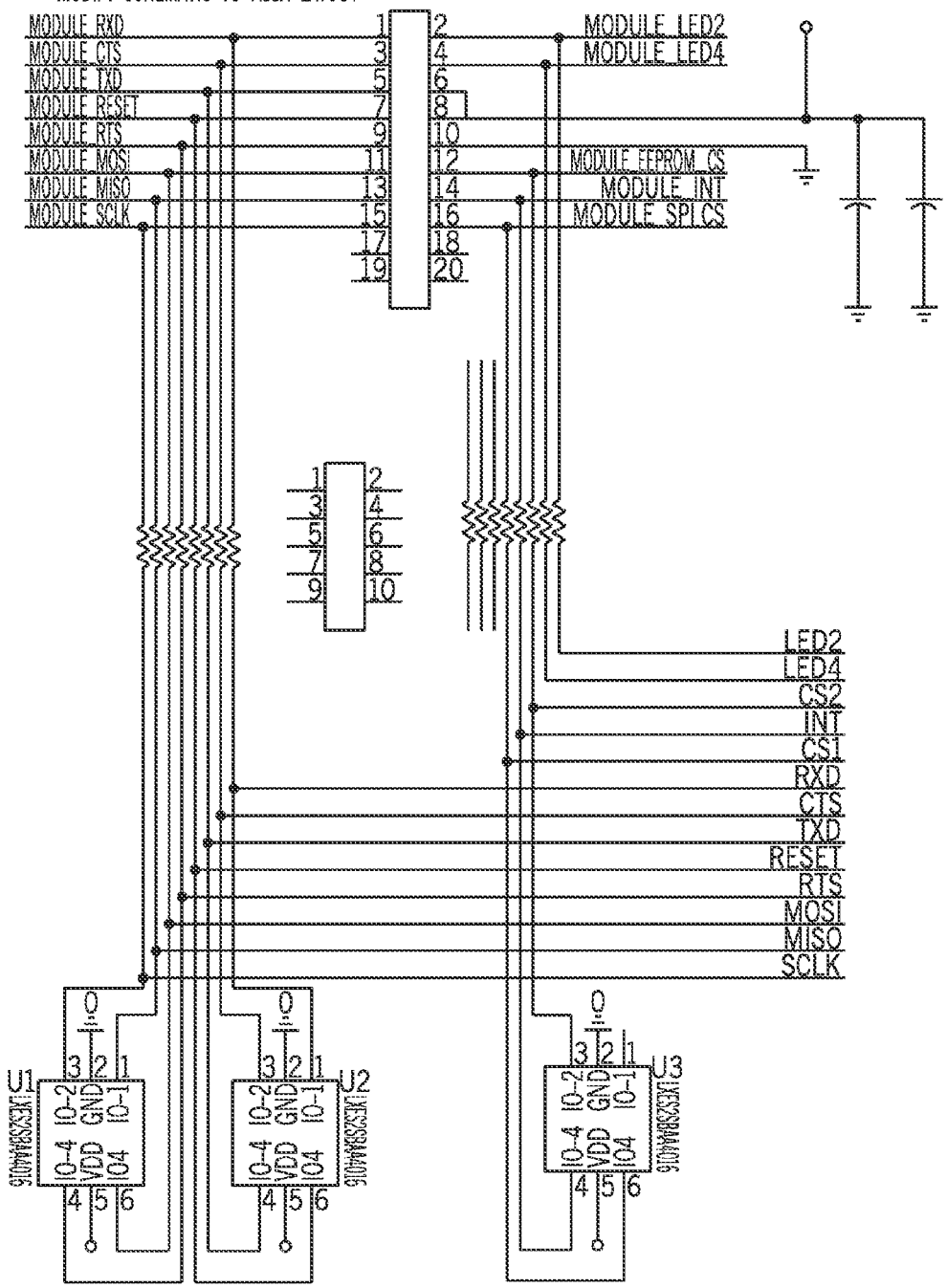
FIG. 8A-C is a diagram illustrating an adapter board connector for the wireless remote control in accordance with the present invention.
Figure 8B:
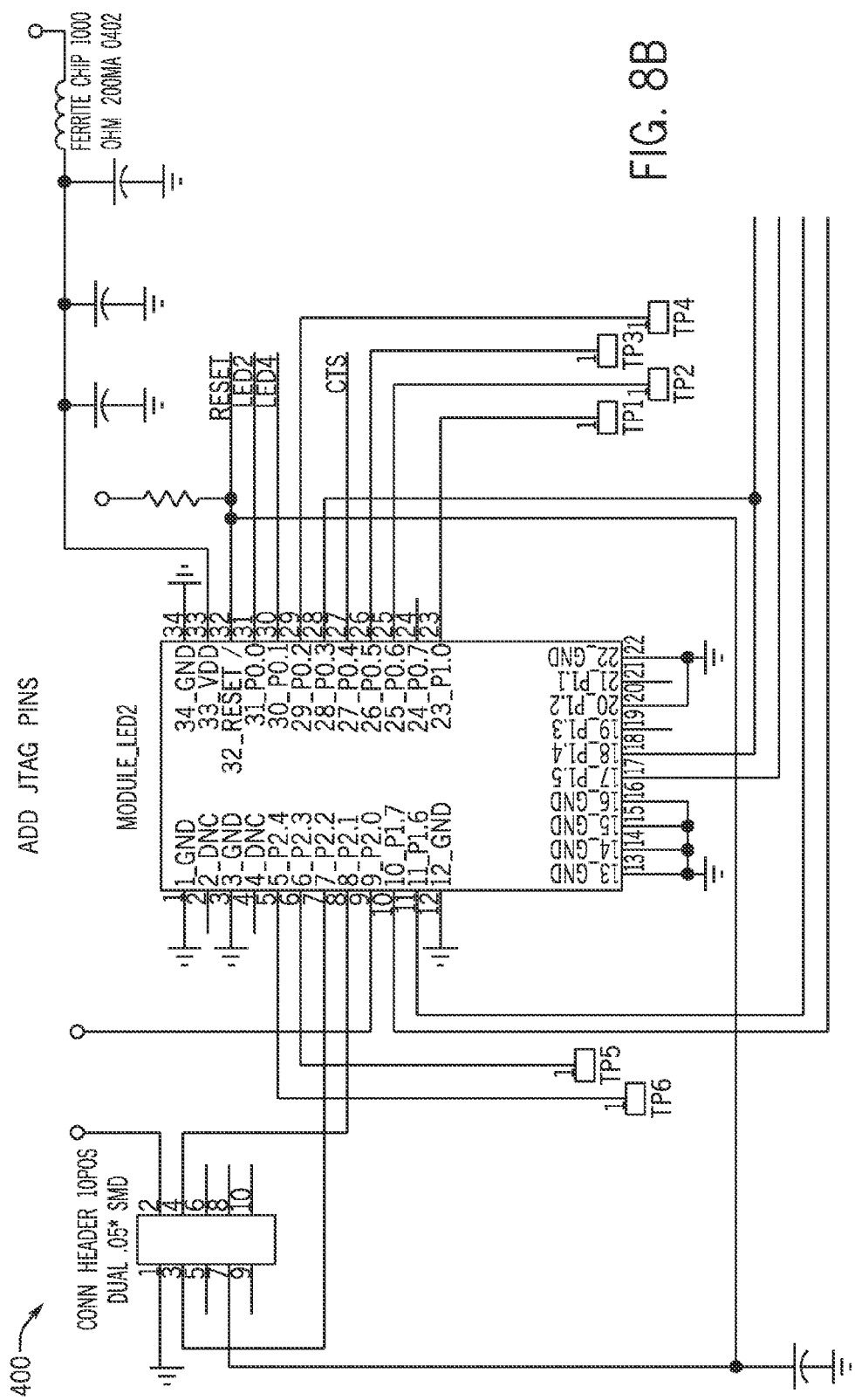
Figure 8C:
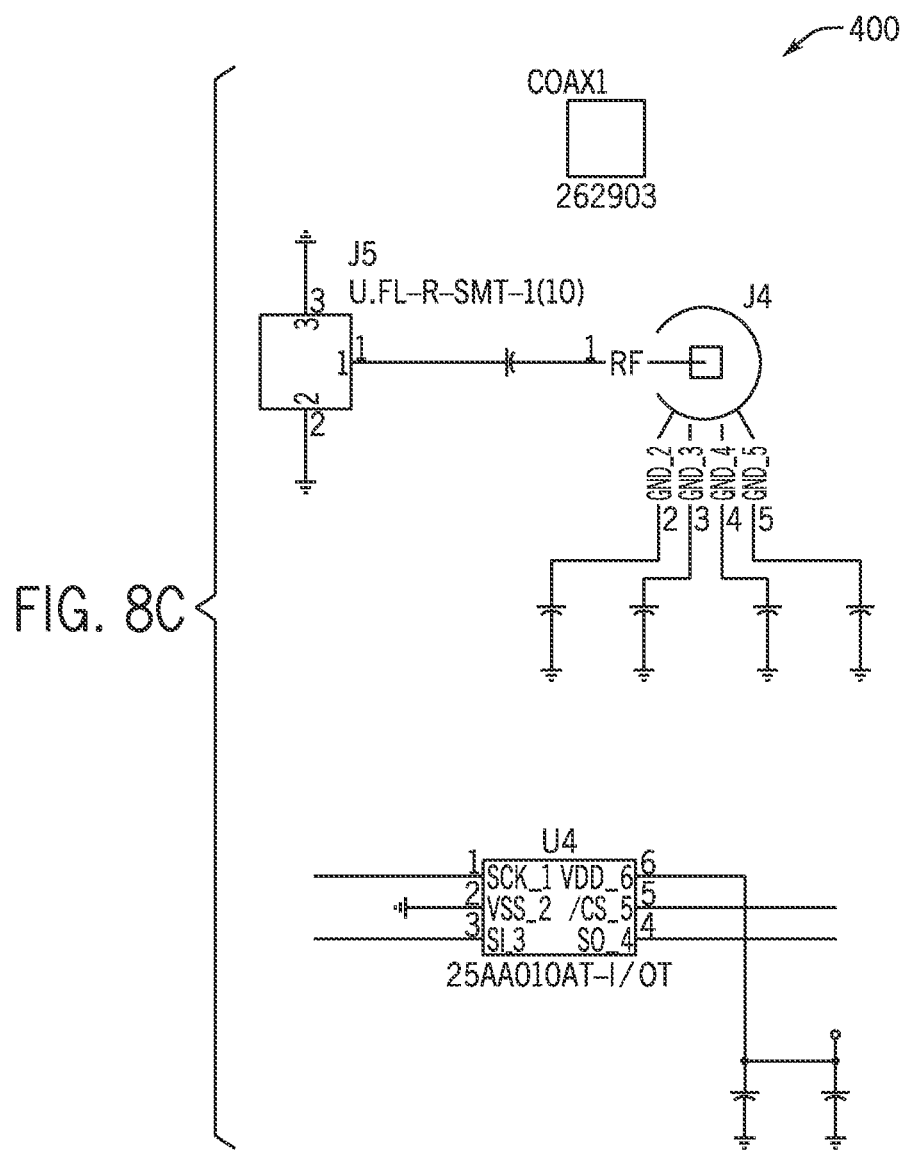

Referring now to FIG. 8, an adapter board connector 400, to be implemented into the welding-type system 10 of the present invention, is shown. The adapter board connector 400 may be used with any wireless equipped welding-type system 10, such as a Trailblazer 325 EFI or Axcess with Insight, for example. The adapter board connector 400 may use a ZigBee (IEEE 802.15.4) adapter board, for example, to serve as a universal interface connector. The adapter board connector 400 uses a UART and a SPI connection along with two chip selects for the SPI connection (allows either the radio or an on-board memory to be accessed), two LED connections for testing or debug purposes, and an interrupt signal.

Conventional adapter board connectors require the user to select all of the parts needed to make a radio system and place these in some logical fashion on the same printed wiring board, for example, as used for the main control for the power source 16. If this approach is used, the board requires re-design, thereby increasing costs for both the re-design and testing. Alternatively, the user may use a tested and certified modular radio transmitter, however this does not require that the host device be tested as though it were a radio (as would be required in the first approach). This may result in significantly reducing the risk of adding wireless communications. In this approach, the radio module would be attached directly to the host printed wiring board and the host software would be written expressly and solely for that radio.

In yet another alternative, the user may first define a connector scheme which covers the majority of the use cases and then design an adapter board to which on one side is mounted the mating connectors to the host board and on the other side is mounted any required components and the radio module itself. In this approach, two radios with differing physical mounting patterns can each be placed on a unique adapter board and each will connect to the same host without the host requiring any hardware changes.

The adaptor board connector 400 of the present invention, however, may significantly decreases the hardware development effort for designs required to connect to a wireless network. Additionally, the adaptor board connector 400 may reduce risk in manufacturing if a radio manufacturer cannot meet deliveries, such that an alternate and qualified radio apparatus can be substituted with no change in hardware. Also, the radio design is effectively decoupled from the welding-type system 10 development. Basically, the adaptor board connector 400 allows any variety of Certified Radio Modules to be connected to a welding-type system 10 without requiring the re-design and re-layout of printed wiring cards as radio modules are changed. In other words, the adaptor board connector 400 is a 'standard' host Printed Wiring Board (PWB) connector with a standard size 'adapter board'. The schematic and layout of the adapter board may be designed for a custom one-to-one fit between a specific radio apparatus and the standard connector. A memory device may be incorporated on the adapter board 400 so that a host micro-processor can read this memory to discover which radio apparatus is connected, thereby allowing the proper software drivers to be used to communicate with the radio apparatus.

Thus, a system and method is provided for using a wireless communication terminal (WCT) through a terminal device and exchanging data between the remote welding-type devices and the terminal device. In addition, the invention relates to a welding system whose operation is governed by control signals transmitted by a wireless remote control. The wireless remote control is configured to pair with the welding-type devices that initiate a code download to the wireless remote control. In this regard, an operator is able to quickly and efficiently control a welding system from a remote location, regardless the make and model of the different welding-type devices that may be present at one location.

The present invention provides a remote control device that is easily handled by an operator and which can wirelessly control a plurality of welding processes. The present invention can eliminate the use of a communications cord with a wireless remote device and, thereby, the problems associated with high frequency electrical noise as described above. The wireless remote control also provides for many benefits and conveniences for an operator, such as reducing the inconvenience of extra cables. In addition, the wireless remote that pairs with any welding-type system with a single user interface increases operator efficiency and decreases scheduled downtime.

The present invention has been described in terms of one or more preferred embodiments, and it should be appreciated that many equivalents, alternatives, variations, and modifications, aside from those expressly stated, are possible and within the scope of the invention.

The invention claimed is:

1. A welding-type system comprising:
 a power source having a controller to regulate welding operations for at least one welder;
 a wireless communication system configured to receive a wireless signal and provide the wireless signal to the controller for controlling the at least one welder according to at least one operational parameter indicated by the wireless signal;
 a pairing apparatus coupled to the wireless communication system and configured to:
  identify a wireless remote control capable of communicating with the wireless communication system;
  identify the wireless remote control as not running a software configured to remotely access the at least one operational parameter for the welding operations by communicating with the wireless remote control over the wireless communication system; and
  initiate a download of a software image, comprising the software, from the controller to the wireless remote control, using wireless transmission protocol, when the wireless remote control is in an un-programmed state, to configure the wireless remote control to access the at least one operational parameter and update the at least one operational parameter by transmitting an updated operational parameter, using the wireless signal, from the software running on the wireless remote control to the controller.

2. The system as recited in claim 1, wherein the pairing apparatus is configured to determine a type of configurable interface of the wireless remote control and a plurality of buttons of the wireless remote control and select the software image from a plurality of welder controller software images, upgrades or updates to be delivered to the wireless remote control using the wireless transmission protocol.

3. The system as recited in claim 1, wherein the at least one operational parameter includes at least one of an oil parameter, an engine fuel parameter, an engine speed parameter, a battery parameter, a power supply parameter, an engine start/stop parameter, an engine parameter, an engine control parameter, an advanced engine diagnostics parameter, a process mode parameter, an error code parameter, a voltage and current parameter, an arc control parameter, and a polarity control parameter.

4. The system as recited in claim 1, wherein the wireless communication system is configured to communicate using at least one of a ZigBee protocol, a Bluetooth protocol, a Bluetooth Low Power (BLE) protocol, a Bluetooth 4.0 protocol, and a WiFi protocol.

5. The system as recited in claim 1, wherein the pairing apparatus is configured to determine whether the wireless remote control includes a boot loader.

6. The system as recited in claim 1, wherein the wireless communication system includes a WiFi radio apparatus capable of operating as a wireless communication terminal (WCT), allowing the wireless remote control to access an interface via the WCT and configured to exchange data and remotely control the controller in the welding-type system.

7. The system as recited in claim 1, wherein the pairing apparatus is configured to determine whether the wireless remote control includes a single code image to enable a code update to the at least one welder.

8. The system as recited in claim 1, wherein the at least one operational parameter includes commands to remotely power down and power up the at least one welder.

9. A method for remotely controlling a welding-type system, the method comprising:
 providing a power source having a controller for regulating welding operations for a plurality of welders;

determining whether a software for communicating with the controller is present within a memory of the wireless remote control;

responsive to the software not being present within the memory, downloading to the wireless remote control, using a wireless transmission protocol, a software image comprising the software;

configuring the wireless remote control to adjust at least one welding parameter by transmitting, using the wireless signal, an updated welding parameter from the software to the controller;

transmitting a wireless signal from a wireless remote control to the controller to control at least one of a plurality of welding parameters in the plurality of welders based on the updated welding parameter;

receiving the wireless signal to allow the controller to communicate with the wireless remote control;

pairing the wireless remote control to the controller via a radio apparatus installed on the wireless remote control; and accessing and regulating the at least one of the plurality of welding parameters of at least one of the plurality of welders via the radio apparatus of the wireless remote control using the updated welding parameter.

10. The method of claim 9, wherein pairing includes initiating a code download to the wireless remote control using an over-the-air programming protocol to configure the wireless remote control to communicate the plurality of welding parameters to the at least one of the plurality of welders.

11. A remote control system for communicating with a welding-type system comprising:
a wireless communication system configured to send and receive a wireless signal with at least one of a plurality of welding-type systems;
a memory having at least one of a boot loader or executable software stored thereon;
a processor configured to:
communicate with the at least one of the plurality of welding-type systems using the wireless communication system to identify a wireless remote control as not running a software configured to remotely access at least one operational parameter for the at least one of the plurality of welding-type systems;
responsive to a determination that the wireless remote control not running the software, receive a download of a software image comprising the software from the at least one of a plurality of welding-type systems to the wireless remote control, using a wireless transmission protocol; and
install the software image using at least the boot loader or the executable software to configure the wireless remote control to update at least one operational parameter by transmitting an updated operational parameter, using the wireless signal, from the software running on the wireless remote control to the at least one of the plurality of welding-type systems.

12. The system as recited in claim 11, wherein the wireless remote control includes a user interface that, following installation of the software image, operates as a process mode selector to allow an operator to select a desired welding process that is communicated over the wireless communication system to control the at least one of a plurality of welding-type systems to operate according to the desired welding process.

13. The system as recited in claim 11, wherein the processor is configured to identify a given welder in the plurality of welding-type systems by triggering the given welder to signal using one of a beeper and a light.

14. The system as recited in claim 11, wherein the processor is configured to perform a pairing process to communicate with a given welder in the plurality of welding-type systems.

15. The system as recited in claim 11, wherein the wireless remote control is configured to remotely power down and power up the at least one of the plurality of welding-type systems.

16. The system as recited in claim 11, wherein the wireless remote control includes a graphic display configured to display a status of the at least one of the plurality of welding-type systems.

17. A method for remotely controlling a welding-type system, the method comprising:
providing a wireless remote control having an antenna system configured to communicate with a plurality of welders;
identifying at least one of the plurality of welders;
determining whether a software for communicating with the at least one of the plurality of welders is present in a memory of the wireless remote control;
upon determining that the software for communicating with the at least one of the plurality of welders is not present in a memory of the wireless remote control, receiving a software image download from the at least one of the plurality of welders;
installing the software image download received from the at least one of the plurality of welders; and
using the software image download installed on the wireless remote control, controlling operation of the at least one of the plurality of welders.

18. The method as recited in claim 17, further comprising performing a pairing process with the at least one of the plurality of welders before controlling operation of the at least one of the plurality of welders.

19. The method as recited in claim 17, wherein installing the software image download includes utilizing an over-the-air programming protocol directed by the at least one of the plurality of welders.

20. The method as recited in claim 17, wherein, prior to installing the software image download, the wireless remote control is free of software for controlling the plurality of welders.

* * * * *